United States Patent

[11] 3,581,108

[72] Inventor Irving V. Eisenmenger
Burlington, N.C.
[21] Appl. No. 781,359
[22] Filed Dec. 5, 1968
[45] Patented May 25, 1971
[73] Assignee Western Electric Company, Incorporated
New York, N.Y.

[54] SINGLE OUTPUT SELECTING CIRCUIT EMPLOYING A PLURALITY OF INTERLOCKED NOR-GATES
3 Claims, 7 Drawing Figs.

[52] U.S. Cl. .......... 307/215, 328/92, 328/97
[51] Int. Cl. .......... H03k 19/34
[50] Field of Search .......... 307/207, 208, 215, 223, 224, 289, 291; 328/92, 97, 205

[56] References Cited

UNITED STATES PATENTS

| | | | |
|---|---|---|---|
| 3,079,513 | 2/1963 | Yokelson | 307/215 |
| 3,151,236 | 9/1964 | La Beaume | 307/224(X) |
| 3,192,406 | 6/1965 | Somlyody | 307/224(X) |
| 3,474,262 | 10/1969 | Turcotte | 307/215(X) |

*Primary Examiner*—Stanley D. Miller, Jr.
*Attorneys*—S. Gundersen, H. J. Winegar and R. P. Miller

ABSTRACT: A plurality of NOR gates are arranged with the output of each gate connected to an associated output terminal and to an input of every other gate. Energization of a selected output terminal, inhibits the operation of each gate other than the one associated with the selected output terminal thereby latching the one associated with the selected terminal in an energized condition and the nonselected terminals in a nonenergized condition.

INVENTOR
I. V. EISENMENGER
By D. W. Marks
ATTORNEY

SINGLE OUTPUT SELECTING CIRCUIT EMPLOYING A PLURALITY OF INTERLOCKED NOR-GATES

BACKGROUND OF THE INVENTION

1. Field of the Invention

The invention relates to a logic circuit for actuating a selected one of a plurality of outputs while latching all others of the plurality of outputs in an unactuated condition. In certain circuit applications, it is necessary to select one output from a plurality of outputs by placing a preselected signal thereon. Concurrently, it may also be necessary to ensure that every other output in the group of outputs is devoid of that signal.

2. Description of the Prior Art

In the past, a number of different circuits have been devised which employ logic gates to selectively energize one output while latching a different output in an energized condition. A number of flip-flops operate in this manner. Further, it is known in certain counting circuits employing logic gates, to obtain stepping action by crosscoupling adjacent logic gates. However, none of these prior circuits permit the arbitrary selection of one output from a plurality of different outputs along with concurrent means of assuring that only the selected output remains energized.

SUMMARY OF THE INVENTION

In one embodiment of the invention, a circuit is contemplated wherein the selection of one output terminal from a plurality of output terminals energizes gating means to inhibit the selection of all other output terminals. More particularly, a plurality of logic gates are connected with their outputs associated with one output terminal and connected to an input of every other logic gate. Energization of a selected terminal is communicated to each of the logic gates to inhibit the operation of all gates other than the one associated with the selected terminal thereby inhibiting the nonselected terminals.

BRIEF DESCRIPTION OF DRAWING

The nature of the present invention and its various advantages will appear more fully be referring to the following detailed description in conjunction with the appended drawing, in which.

DETAILED DESCRIPTION

Figure 1:
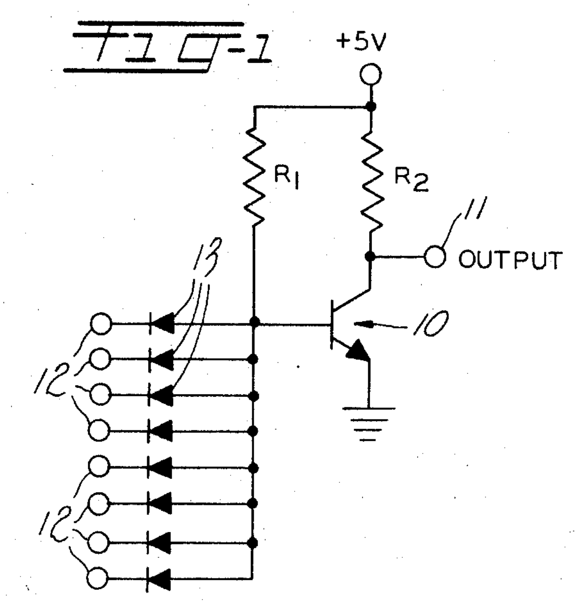
FIG. 1 is a schematic drawing of an individual NOR-type logic gate which may be employed in the invention.

The invention, as will be described herein, will be disclosed in terms of logic gates of the NOR-type. NOR gates are characterized in that an output is present, which will be denoted as either "1 " or ground condition, only when all the inputs to the gate have no input thereon, denoted as either a "0 " or a positive 5 volts. Referring to FIG. 1, a transistorized embodiment of a NOR gate which may be employed is shown in which the emitter of a NPN transistor 10 is grounded and its collector is connected to a +5-volt source through a resistor $R_1$. The base of the transistor 10 is normally connected to a +5-volt source through a bias resistor $R_2$so that the transistor is normally biased into conduction. An output terminal 11 is connected to the collector of the transistor. A plurality of inputs 12–12 are connected, respectively, through a diode 13, to the base of the transistor 10. When a ground signal ("1") is connected to any one of the terminals 12, the base of the transistor is grounded so that the transistor ceases to conduct and the output terminal 11 goes to a +5-volts condition ("0"). It may be seen that the circuit only produces a "1" as an output when there are "0"'s on all the inputs 12–12. If any one of the inputs 12–12 has a "1" impressed thereon, the output of the transistor 10 is "inhibited" from producing a "1" and the output of the circuit at terminal 11 is a "0."

Figure 2:
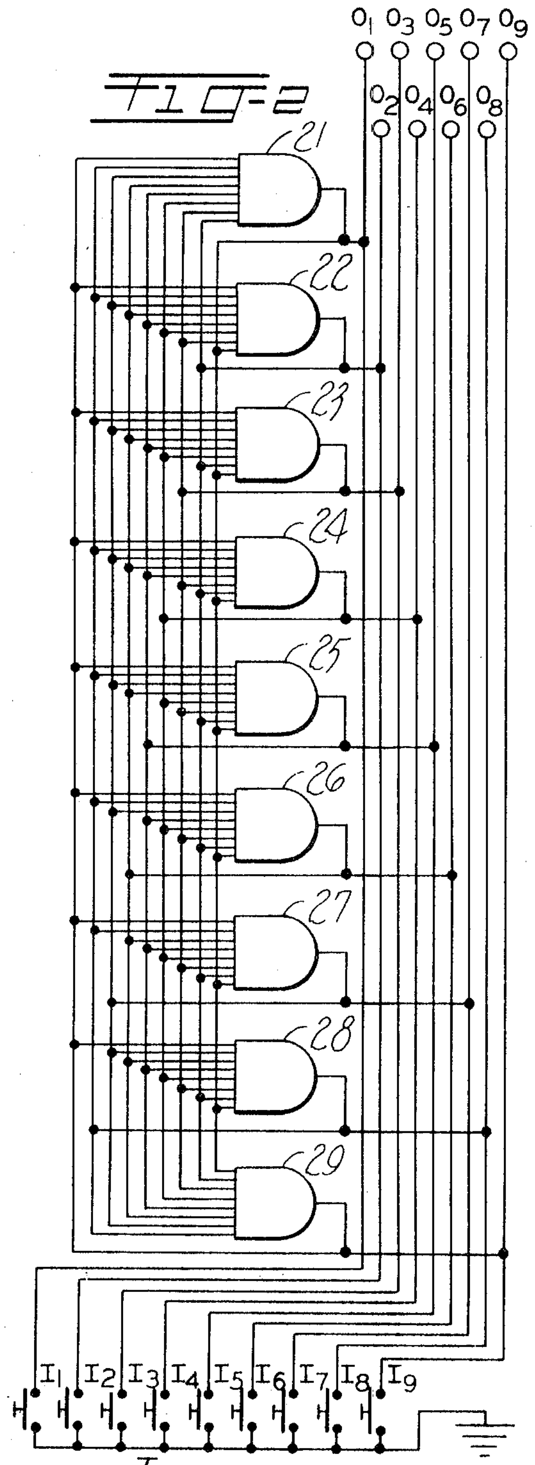
FIG. 2 is a schematic drawing of a logic latching circuit constructed in accordance with the invention.

Referring to FIG. 2, a plurality of NOR gates 21—29 are connected so that the output of each gate is connected to the input of every other gate. For example, the output of gate 21 is connected to each one of the eight gates denominated 22 through 29. Likewise, gate 25 is connected to the inputs of the four gates denominated 21 through 24 and the four gates denoted 26—29. Each one of the outputs of the gates 21—29 are connected respectively to a series of inputs $I_1$—$I_9$which are shown illustratively as momentary switches which upon closure momentarily connect the respective inputs to a ground condition ("1"). However, it is to be understood that any means for impressing a momentary ground selectively upon any one of the inputs $I_1$—$I_9$ may be employed.

Each one of the inputs $I_1$—$I_9$, along with the output of its associated gate, are respectively connected to a corresponding one of a series of output terminals $0_1$—$0_9$. When a ground condition ("1") is momentarily placed upon input terminal $I_1$by the closure of the associated switch, the same ground condition is connected to the output of NOR gate 21 and the output terminal $O_1$. Although the outputs $O_1$—$O_9$are shown as terminals in FIG. 2, it is to be understood that this is merely illustrative and that these terminals could be in turn connected to control other circuits.

In operation, when a "1" is placed upon a selected one of the inputs $I_1$—$I_9$, a "1" also appears upon the associated output terminals $O_1$—$O_9$. The "1" is also connected to the output of the associated one of the NOR gates 21—29 which affects the latching and inhibits the operation of all other output terminals other than the selected one to a "O" condition in the following manner. When a "1" is placed upon the output of a selected NOR gate, that "1" is also connected to an input terminal of every one of the other NOR gates except the selected one. The input signal inhibits the production of an output by the NOR gates and insures that each one of the output terminals remain in a "O" condition. For example, assume that a "1" is placed upon input terminal $I_3$so that an output "1" appears at output terminal $O_3$. Since terminal O $_3$has now been selected from the plurality of terminals $O_1$—$O_9$, it is desirable that terminals $O_1$—$O_2$and $O_4$—$O_9$remain in or return to the "O" state. The "1" condition is connected to the output of NOR gate 23 and is thereby coupled to the input of each of the other NOR gates 21, 22 and 24—29. As long as the "1" is connected to the input of these gates, the gates cannot produce a "1" at their output and therefore each of the output terminals other than terminal $O_3$remains at "O."

When the actuating ground source is removed from the selected input, the input remains at ground condition until reset. When a second input is selected by placing a momentary ground thereon, the first selected input is reset to a "O" condition along with all the other inputs except the second selected input which remains at "1."

A characteristic of the circuit in FIG. 2 is that the inputs ($I_1$-—$I_9$) are directly connected to the outputs ($O_1$—$O_9$) so that the input remains at a ground condition and it has been grounded. If an input circuit such as the collector of a grounded emitter transistor is used to drive the inputs $I_1$—$I_9$, then the transistor is shortened to ground by the ground condition coming from the output of the selected NOR gate and the input circuit continues to supply current after the selection process is finished. The input and output waveforms for the selected NOR gate appears, as shown, respectively, in FIGS. 3*a* and 3*b*. The selection of an input is made at time $t_1$.

Figures 3A, 3B, 4A, 4B:
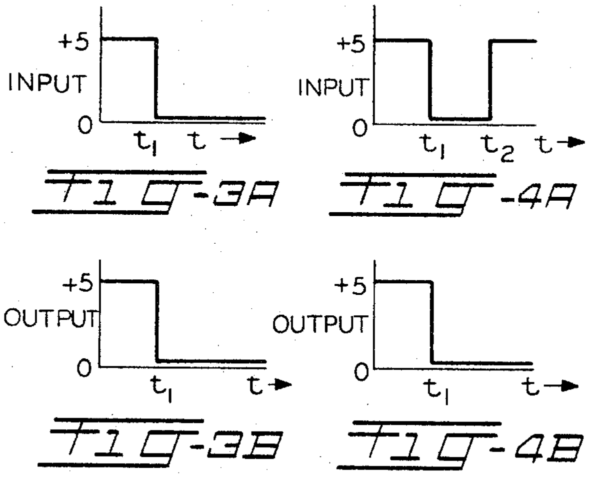
FIGS. 3*a* and 3*b*, respectively, show the input and output waveforms present in the utilization of the logic latching circuit shown in FIG. 2.
FIGS. 4*a* and 4*b*, respectively, show the input and output voltage waveforms which may be employed in another embodiment of the invention, namely that shown in FIG. 5.

For certain applications, it may be desirable to construct a logic latching circuit having the input-output voltage characteristics shown in FIG. 4. An input is shown in FIG. 4*a*in which a signal transists from a "0" condition (+5 volts) to a "1" condition (zero volts or ground) at time $t_1$ and remains in that condition until time $t_2$ when it returns to its former "O" condition. If the collector of a grounded emitter transistor is again used to drive the input of the circuit, the collector is allowed to return to a nonground condition following the selection process and the input circuit does not continue to supply current. It may be desirable to actuate a logic latching circuit with the form of input and obtain an output signal persisting in a "1" condition indefinitely from the time $t_1$ while the input returns to a "OO" condition.

Figure 5:
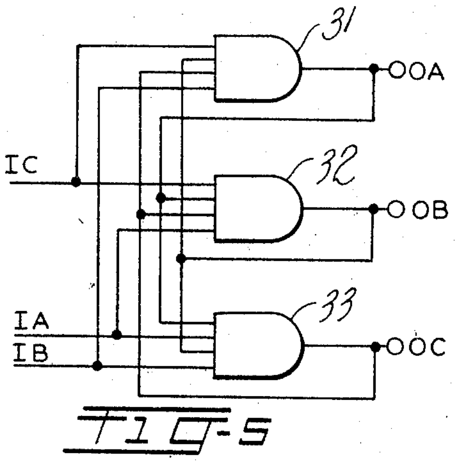
FIG. 5 shows a schematic drawing of an alternate embodiment of the logic latching circuit of the invention.

Referring to FIG. 5, a circuit is shown having the input and output characteristics shown in FIGS. 4*a* and 4*b*, respectively, A plurality of NOR gates 31—33 are again connected so that the output of each gate is connected to the input of every other gate. It is to be understood that any number of NOR gates could be connected as shown in FIG. 5, and the circuit is only shown with three gates to illustrate the manner of operation. A first input IA is connected to the inputs of both the gates 32 and 33. A second input IB is connected respectively to the inputs of gates 31 and 33. Likewise, a third input IC is connected to the inputs of the gates 31 and 32. The output of NOR gate 31 is denominated OA, the output of gate 32 as OB, and that of gate 33 as OC.

In the operation of FIG. 5, when an input "1" is applied to selected input IA, both of the gates 32 and 33 are locked into the "O" state, and the outputs thereof (both "O"'s) are connected to two of the four inputs of the gate 31. The other two inputs of the gate 31 are connected to the inputs IB and IC which have "O"'s thereon (since they were not selected) so that all four inputs to the gate 31 are "O" therefore its output terminal OA is a "1". Now when the input "1" is removed from terminal IA so that all three of the input terminals IA-IC are "O", the output OA remains at a "1" because that output is connected to the inputs of the other two gates 32 and 33 whose outputs therefore remain "O" and thereby hold two of the inputs to gate 31 at "O." In a similar manner, a momentary selection of any one of the inputs IA-IC by placing a "1" thereon results in a "1" appearing at the associated output terminal OA-OC and at that terminal only. The "1" remains impressed upon the selected output until the locking circuit is broken by selecting a different one of the inputs IA-IC by placing a momentary ground thereon.

It is to be noted that the circuit in FIG. 5, unlike that of FIG. 2, allows the input terminal to return to a "O" condition following selection. Thus, if the collector of a grounded emitter transistor is used as an input driving circuit, the transistor is not held actuated after the selection process.

It is to be understood that the above-described embodiments are simply illustrative of the invention and that many other embodiments, such as could be constructed with logic gates of other types, can be devised without departing from the scope and spirit of the invention.

What I claim is:

1. A logic latching circuit, comprising:

a plurality of three or more output terminals;

a plurality of three or more input terminals, each of said input terminals respectively associated with one of said output terminals;

a plurality of three or more NOR-type logic gates, each of said gates having its output connected to one of said output terminals and to an input of every other one of said logic gates;

means for connecting each of said input terminals to an input of every logic gate other than the gate associated with the corresponding input and output terminals so that a select signal, applied to a selected input terminal, inhibits the operation of each gate other than the one connected to the output terminal associated with the selected input terminal, which associated gate is latched into an energized condition by said inhibited gates to energize the output terminal associated with the selected input terminal.

2. An output selecting circuit comprising:

a plurality of three or more input terminals;

a plurality of three or more output terminals each respectively connected directly to one of said input terminals; and a plurality of three or more NOR-type logic gates, each of said gates having its output connected to an associated one of said output terminals and to an input of every other gate so that a select signal placed on a selected one of said input terminals is communicated to an input of each gate other than the one associated with the selected terminal thereby inhibiting the nonselected gates and their associated output terminals.

3. An output selecting circuit comprising: a plurality of three or more input terminals;

a plurality of three or more output terminals each respectively associated with one of said input terminals; and a plurality of three or more NOR-type logic gates, each of said gates having its output connected to an associated one of said output terminals and to an input of every other gate, each of said input terminals connected directly to an input of each logic gate other than the gate having its output connected to the output terminal associated with the corresponding input terminals so that a select signal placed upon a selected one of said input terminals inhibits the operation of each logic gate other than the one associated with the corresponding output terminal thereby inhibiting the nonselected gates and their associated output terminals while energizing the corresponding selected output terminal.